(12) United States Patent
Runde

(10) Patent No.: US 12,325,336 B2
(45) Date of Patent: Jun. 10, 2025

(54) SEAT ASSEMBLY WITH ZERO-GRAVITY POSITION

(71) Applicant: MAGNA SEATING INC, Aurora (CA)

(72) Inventor: David M Runde, Ortonville, MI (US)

(73) Assignee: Magna Seating Inc., Aurora (CA)

( * ) Notice: Subject to any disclaimer, the term of this patent is extended or adjusted under 35 U.S.C. 154(b) by 152 days.

(21) Appl. No.: 18/037,579

(22) PCT Filed: Nov. 18, 2021

(86) PCT No.: PCT/US2021/059958
§ 371 (c)(1),
(2) Date: May 18, 2023

(87) PCT Pub. No.: WO2022/109180
PCT Pub. Date: May 27, 2022

(65) Prior Publication Data
US 2023/0398913 A1    Dec. 14, 2023

Related U.S. Application Data

(60) Provisional application No. 63/115,122, filed on Nov. 18, 2020.

(51) Int. Cl.
*B60N 2/30* (2006.01)
*B60N 2/10* (2006.01)
*B60N 2/90* (2018.01)

(52) U.S. Cl.
CPC .............. *B60N 2/3047* (2013.01); *B60N 2/10* (2013.01); *B60N 2/3011* (2013.01); *B60N 2/995* (2018.02)

(58) Field of Classification Search
CPC ........ B60N 2/3047; B60N 2/995; B60N 2/10; B60N 2/3011
See application file for complete search history.

(56) References Cited

U.S. PATENT DOCUMENTS

| | | |
|---|---|---|
| 4,790,599 A | 12/1988 | Goldman |
| 7,311,359 B2 | 12/2007 | Smith |
| 9,010,851 B2 | 4/2015 | LaPointe |
| 9,045,061 B2 | 6/2015 | Kostin et al. |
| 9,603,453 B2 | 3/2017 | Hoffman et al. |
| 2010/0253129 A1 | 10/2010 | Dowty et al. |

FOREIGN PATENT DOCUMENTS

| | | |
|---|---|---|
| CN | 111186345 | 5/2020 |
| DE | 202011001375 | 3/2011 |
| WO | 2020198116 | 10/2020 |

*Primary Examiner* — Mark R Wendell
(74) *Attorney, Agent, or Firm* — Miller Canfield

(57) ABSTRACT

A seat assembly for use by an occupant in an automotive vehicle includes a seat cushion pivotally coupled to a seat base at a cushion pivot. The seat assembly further includes a seat back pivotally coupled to the seat cushion at a lower recline pivot. A tilt mechanism is further coupled between the seat cushion and the seat base for pivoting of the seat cushion at the cushion pivot to move the seat assembly to and from a zero-gravity position. A first line extends vertically through an H-point of the occupant when the seat assembly is disposed in a design position. The lower recline pivot is positioned under the H-point approximately on the first line and the cushion pivot is positioned forward of the first line to facilitate optimal comfort for the occupant when the seat assembly is disposed in the zero-gravity position.

19 Claims, 11 Drawing Sheets

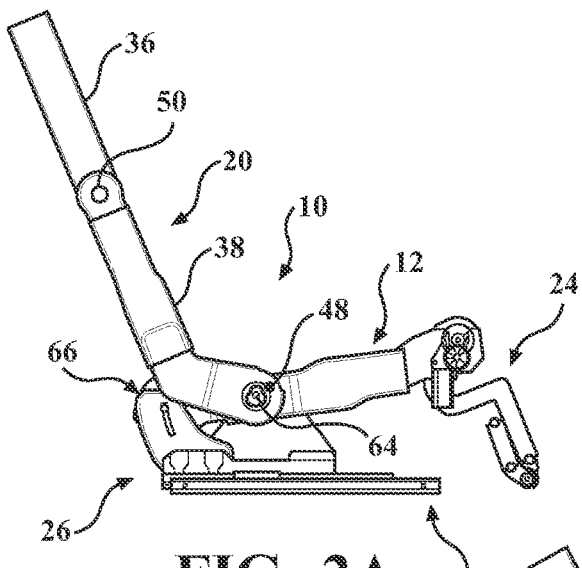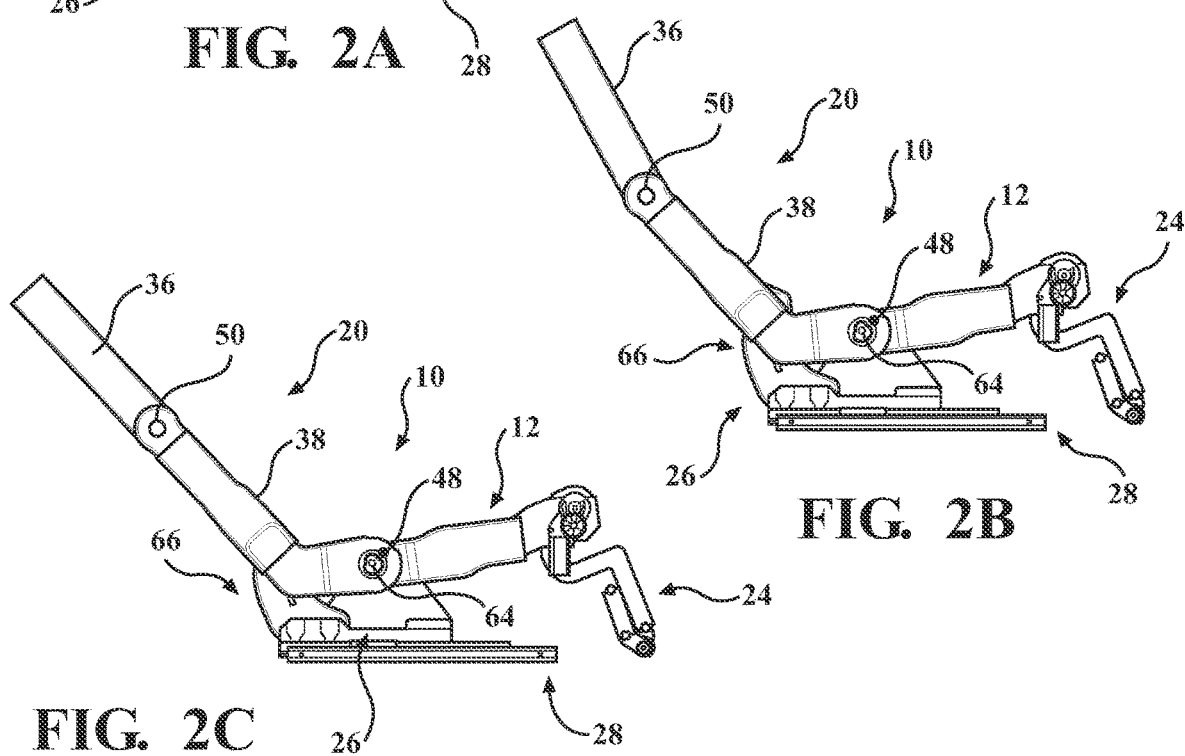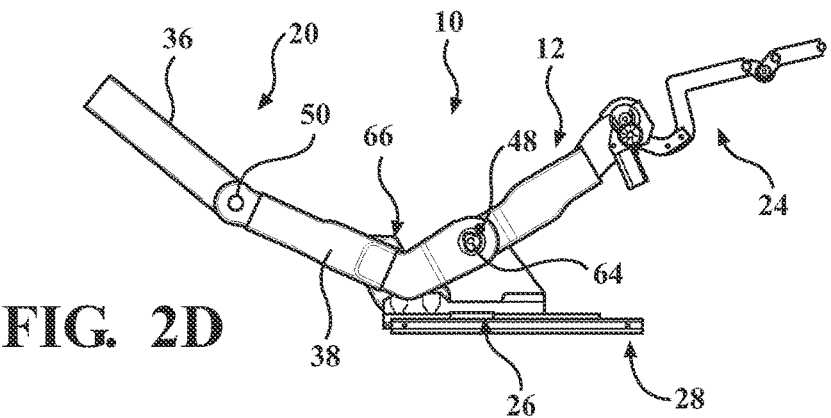

SEAT ASSEMBLY WITH ZERO-GRAVITY POSITION

CROSS-REFERENCE TO RELATED APPLICATIONS

This application claims priority to and all the benefits of U.S. Provisional Application 63/115,122, filed on Nov. 18, 2020, and entitled "Zero-G Seat Structure with Comfort Recline," the disclosure of which is hereby incorporated by reference in its entirety.

BACKGROUND OF THE INVENTION

1. Field of the Invention

The present invention relates to a seat assembly for use by an occupant in an automotive vehicle.

2. Description of Related Art

Seat assemblies for use by an occupant in an automotive vehicle are known in the art. Typical seat assemblies include a seat base adapted for mounting the seat assembly within the automotive vehicle and a seat cushion for supporting the occupant in the automotive vehicle. The seat cushion is often pivotally coupled to the seat base at a cushion pivot defining a cushion pivot axis. The seat assembly often further includes a seat back pivotally coupled to the seat cushion at a lower recline pivot defining a lower recline pivot axis. The seat assembly is pivotable at the cushion pivot and the lower recline pivot for moving the seat assembly between a design position for upright seating of the occupant within the automotive vehicle and a zero-gravity position in which the seat back pivots rearwardly relative to the seat cushion and the seat cushion pivots rearwardly relative to the seat base for reclined lounging of the occupant within the automotive vehicle. Additionally, an H-point, or hip-point, of the occupant is spaced generally above the seat cushion. However, in conventional seat assemblies, the lower recline pivot is typically positioned rearward of the H-point. When positioned rearward of and generally at a similar height as the H-point, the lower recline pivot can create a bulge between the seat cushion and the seat back when the seat assembly is disposed in the zero-gravity position, possibly causing comfort-related issues for the occupant. Furthermore, positioning of the lower recline pivot rearward of and generally lower than the H-point can cause trimming and craftsmanship issues between the seat back and seat cushion.

SUMMARY OF THE INVENTION

According to one aspect of the invention, a seat assembly is provided for use by an occupant in an automotive vehicle. The seat assembly includes a seat base adapted for mounting the seat assembly within the automotive vehicle and a seat cushion for supporting the occupant in the automotive vehicle. The seat cushion is pivotally coupled to the seat base at a cushion pivot defining a cushion pivot axis. The seat assembly further includes a seat back pivotally coupled to the seat cushion at a lower recline pivot defining a lower recline pivot axis. The seat assembly is pivotable at the cushion pivot and the lower recline pivot for moving the seat assembly between a design position for upright seating of the occupant within the automotive vehicle and a zero-gravity position in which the seat back pivots rearwardly relative to the seat cushion and the seat cushion pivots rearwardly relative to the seat base for reclined lounging of the occupant within the automotive vehicle. Additionally, an H-point of the occupant is spaced generally above the seat cushion. A line (L1) extends vertically through the H-point when the seat assembly is disposed in the design position and defines a front portion and an opposite rear portion of the seat cushion. The lower recline pivot is positioned under the H-point on the line (L1) and the cushion pivot is positioned forward of the line (L1) between the front portion of the seat cushion and the seat base to facilitate optimal comfort for the occupant when the seat assembly is disposed in the zero-gravity position.

BRIEF DESCRIPTION OF THE DRAWINGS

Advantages of the present disclosure will be readily appreciated as the same becomes better understood by reference to the following detailed description when considered in connection with the accompanying drawings, wherein:

FIG. 2A is a simplified side view of the seat assembly of FIG. 1 showing the seat assembly in a design position;

FIG. 2B is a simplified side view of the seat assembly of FIG. 1 showing the seat assembly in a first reclined position;

FIG. 2C is a simplified side view of the seat assembly of FIG. 1 showing the seat assembly in a second reclined position;

FIG. 2D is a simplified side view of the seat assembly of FIG. 1 showing the seat assembly in a zero-gravity position;

DETAILED DESCRIPTION OF THE EMBODIMENTS

Figure 1:
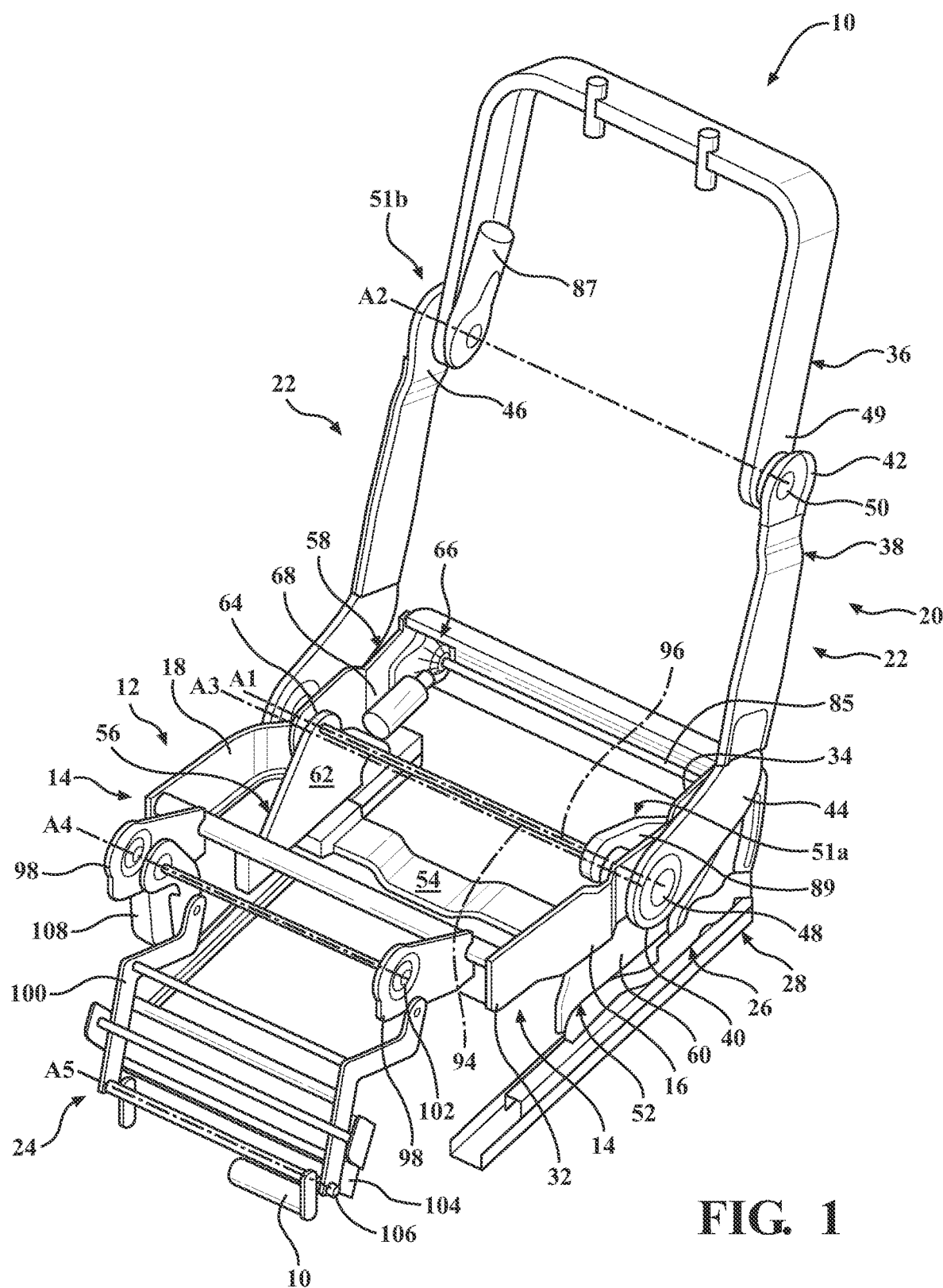
FIG. 1 is a perspective view of a seat assembly for use by an occupant in an automotive vehicle according to a primary embodiment of the present invention.

Referring to the Figures, wherein like numerals indicate like or corresponding parts throughout the several views, a seat assembly for use by an occupant in an automotive vehicle is shown generally at 10. The seat assembly 10 includes a seat cushion 12 with opposing lateral sides 14 for supporting the occupant in the automotive vehicle, and each lateral side 14 has an outer face 16 and an opposite inner face 18. The seat assembly 10 further includes a seat back 20 with opposing lateral sides 22, wherein the lateral sides 22 of the seat back 20 are pivotally coupled to the respective lateral sides 14 of the seat cushion 12 for pivotal movement of the seat back 20 relative to the seat cushion 12. A leg support assembly 24 is also coupled to the seat cushion 12, the leg support assembly 24 operable between a retracted condition and an extended condition for selectively supporting the occupant's extended legs. Referring to FIGS. 1-4, the seat assembly 10 further includes a seat base, shown generally at 26, operatively coupled between the seat cushion 12 and a seat track assembly, shown generally at 28, mounted to a floor of the automotive vehicle for moving the seat assembly 10 in a fore direction and an opposite aft direction relative thereto. Alternatively, the seat assembly 10 can omit the seat track assembly 28 such that the seat base 26 is instead mounted directly to the floor of the automotive vehicle. The seat assembly 10 is operable between a design position, as shown in FIG. 2A, a first reclined position and a second reclined position, as shown in FIGS. 2B and 2C, and a zero-gravity position, as shown in FIG. 2D. In the zero-gravity position, the seat back 20 and seat cushion 12 both recline, and the leg support assembly 24 is disposed in the extended condition, thereby allowing reclined lounging so the occupant, for example, can comfortably rest during rides in the automotive vehicle.

Figure 3:
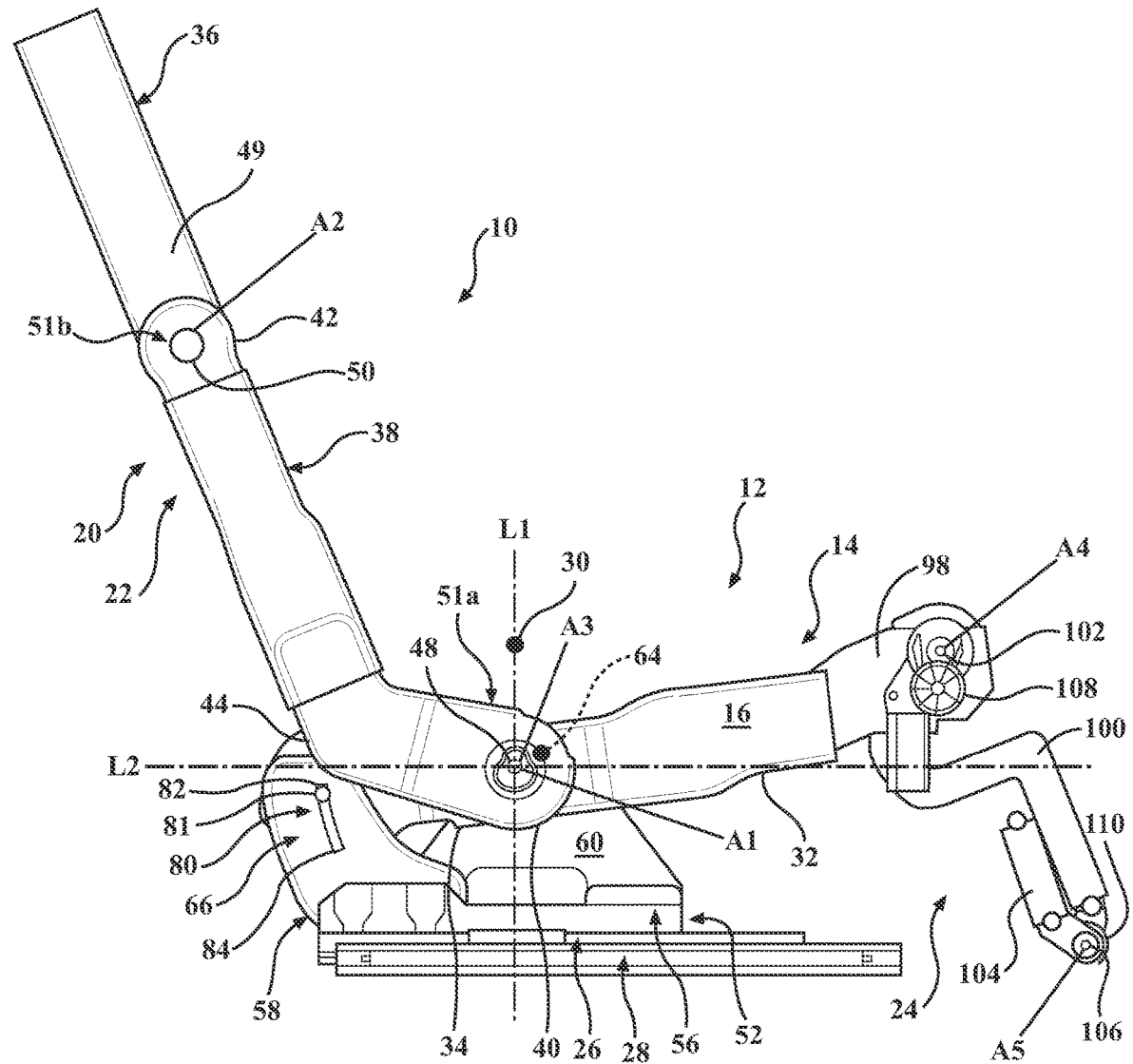
FIG. 3 is a side view of the seat assembly of FIG. 1 further showing the seat assembly in the design position.
Figure 4:
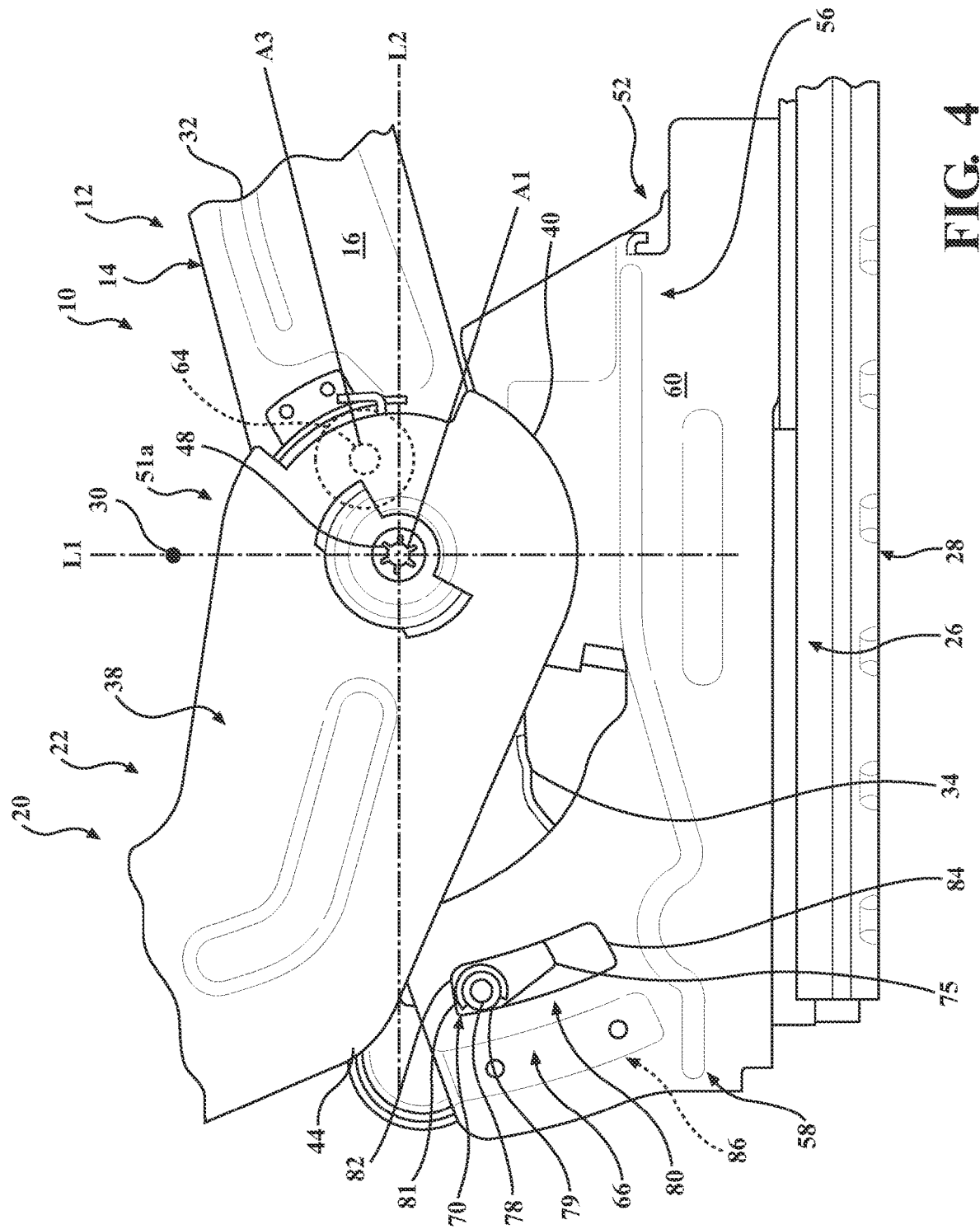
FIG. 4 is an enlarged fragmentary side view of the seat assembly of FIG. 1 showing positioning of a lower recline pivot and a cushion pivot relative to an H-point of the occupant.

Referring to FIGS. 3 and 4, the seat assembly 10 has an H-point, also known as a hip-point, shown at 30 and spaced generally above the seat cushion 12. The H-point 30 is a theoretical location on the seat assembly 10 of the occupant's hip joint, or more specifically, a pivot point between the occupant's hip and the occupant's upper leg. As is known in the art, the H-point 30 is typically measured as the theoretical location on the seat assembly 10 of the hip joint of a 50th percentile male occupant, although it is contemplated that the H-point 30 can be measured relative to any percentile of male or female occupant without varying the scope of the invention. When in the design position, as shown in FIGS. 3 and 4, an imaginary first line L1 extends vertically and substantially perpendicularly from the floor of the automotive vehicle through the H-point 30 of the seat assembly 10, the first line L1 defining a front portion 32 and an opposite rear portion 34 of the seat cushion 12.

Figure 5:
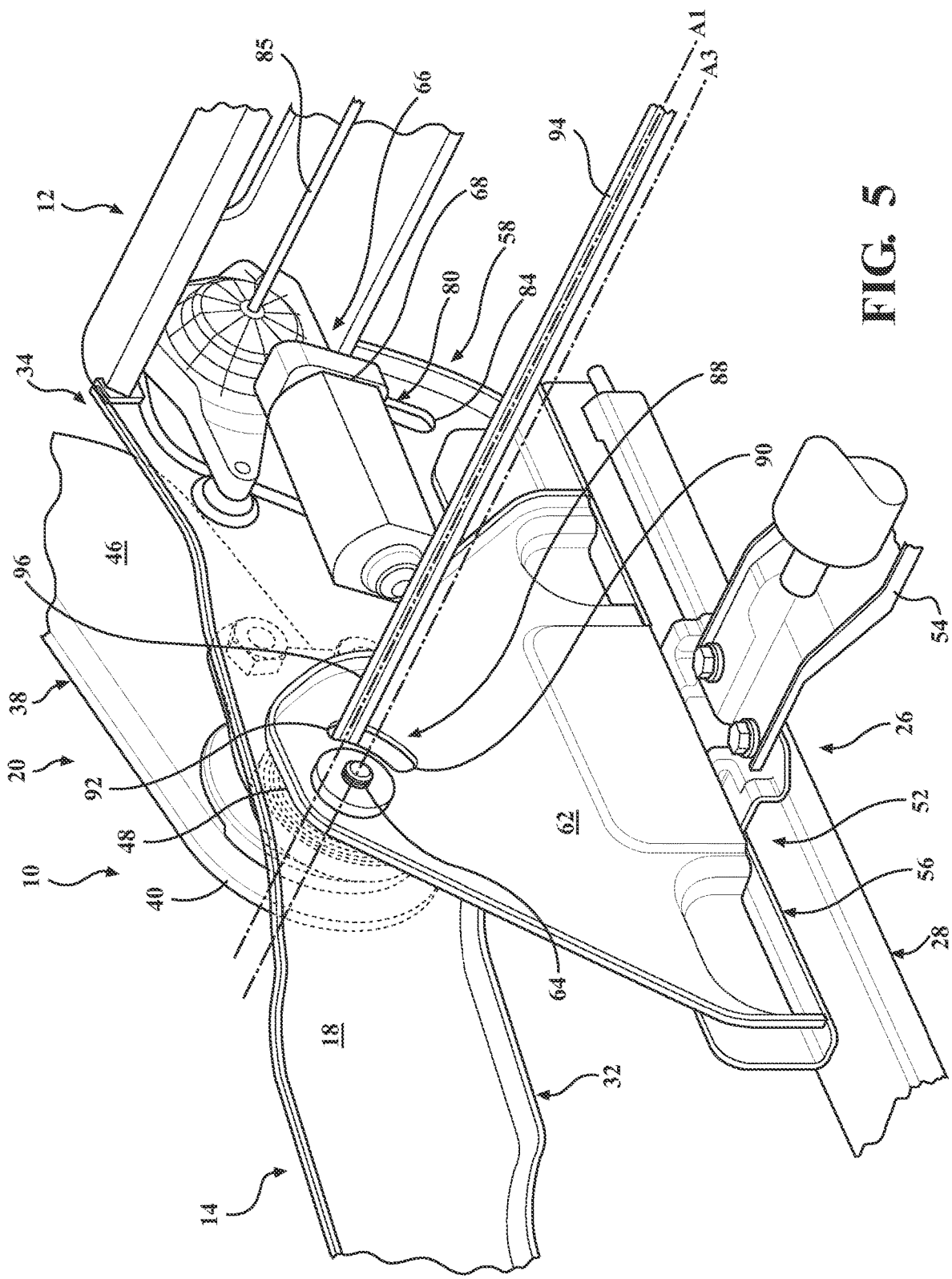
FIG. 5 is an enlarged fragmentary perspective view of the seat assembly of FIG. 1 showing a tilt mechanism for pivoting of a seat cushion at the cushion pivot.
Figure 6:
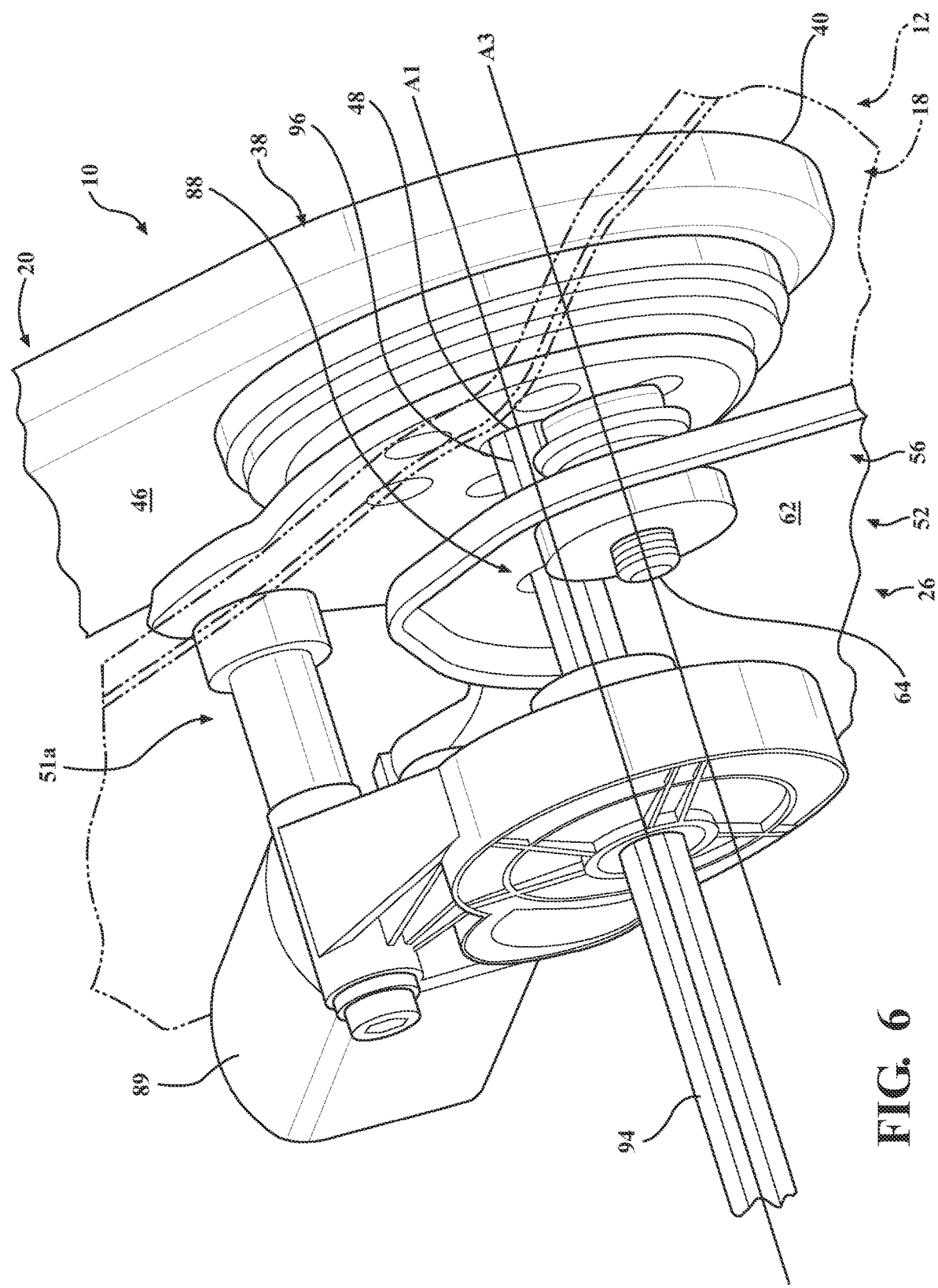
FIG. 6 is an enlarged fragmentary perspective view of the seat assembly of FIG. 1 further showing the lower recline pivot and the cushion pivot.

Referring to FIGS. 1 and 3, each lateral side 22 of the seat back 20 includes an upper seat back portion 36 operatively coupled with a lower seat back portion 38, as is described in further detail below. The lower seat back portion 38 extends between a first end and an opposite second end 42 with an intermediate angled portion 44 spaced therebetween such that the lower seat back portion 38 extends generally rearwardly and upwardly relative to the floor of the automotive vehicle. Referring to FIGS. 5 and 6, an inner face 46 of each lower seat back portion 38 adjacent to the first end 40 thereof is pivotally coupled to the outer face 16 on the respective lateral side 14 of the seat cushion 12 at a lower recline pivot 48 defining a lower recline pivot axis A1. Referring to FIGS. 3 and 4, the lower recline pivot 48 is positioned under the H-point 30 of the seat assembly 10 approximately on the first line L1 when the seat assembly 10 is disposed in the design position. The seat back 20 is pivotable at the lower recline pivot 48 around the lower recline pivot axis A1 for movement of the seat assembly 10 between the design position, as shown in FIGS. 2A and 3, and the first reclined position, shown in FIGS. 2B and 7, in which the seat back 20 tilts rearwardly relative to the seat cushion 12 such that each lower seat back portion 38 from the first end 40 to the angled portion 44 thereof is substantially flush with the seat cushion 12. When the seat assembly 10 is disposed in the design position, as shown in FIGS. 3 and 4, an imaginary second line L2 extends horizontally through the lower recline pivot 48 in the fore and aft directions substantially parallel to the seat base 26 and the floor of the automotive vehicle.

Figure 7:
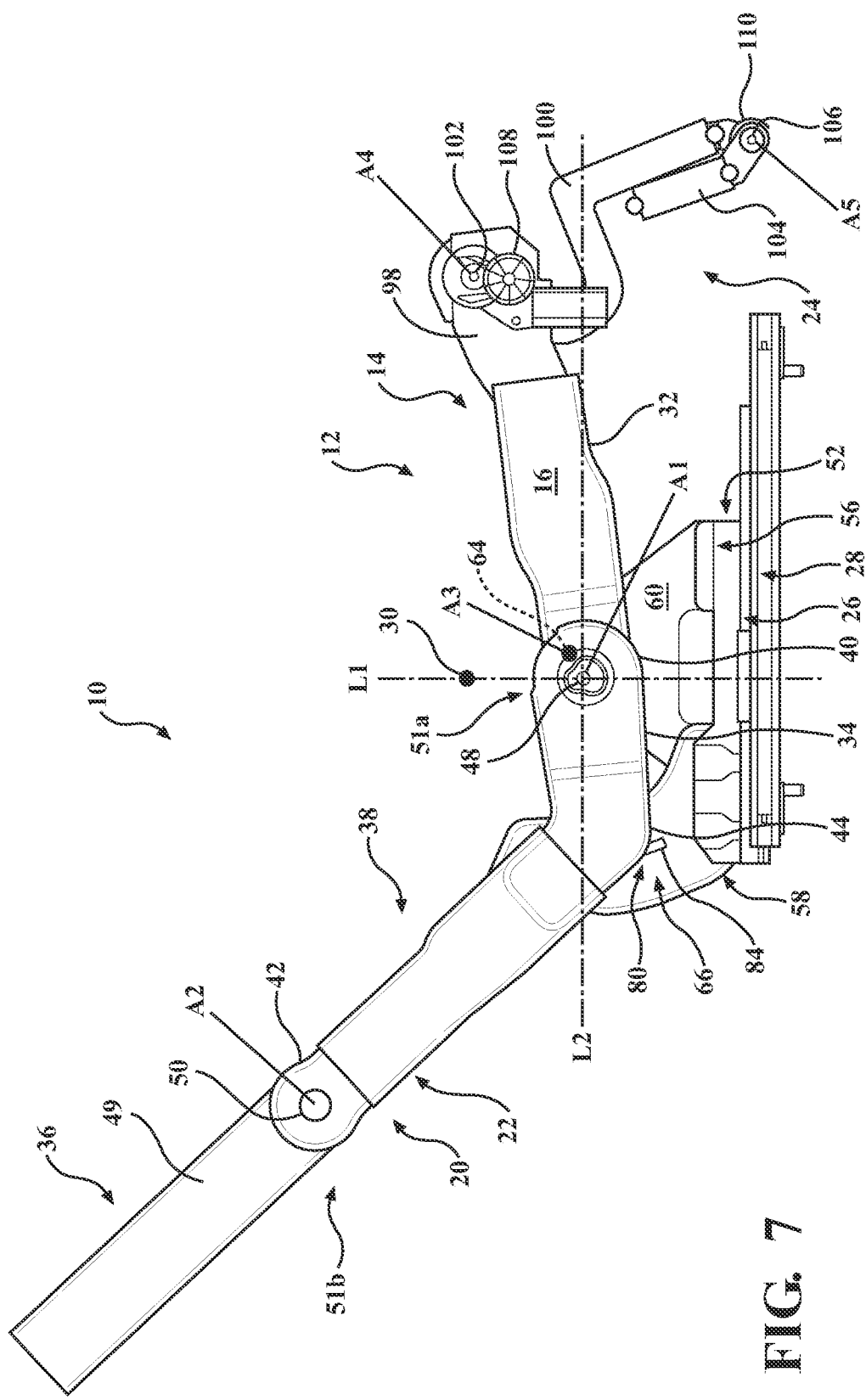
FIG. 7 is a side view of the seat assembly of FIG. 1 further showing the seat assembly in the first reclined position.
Figure 8:
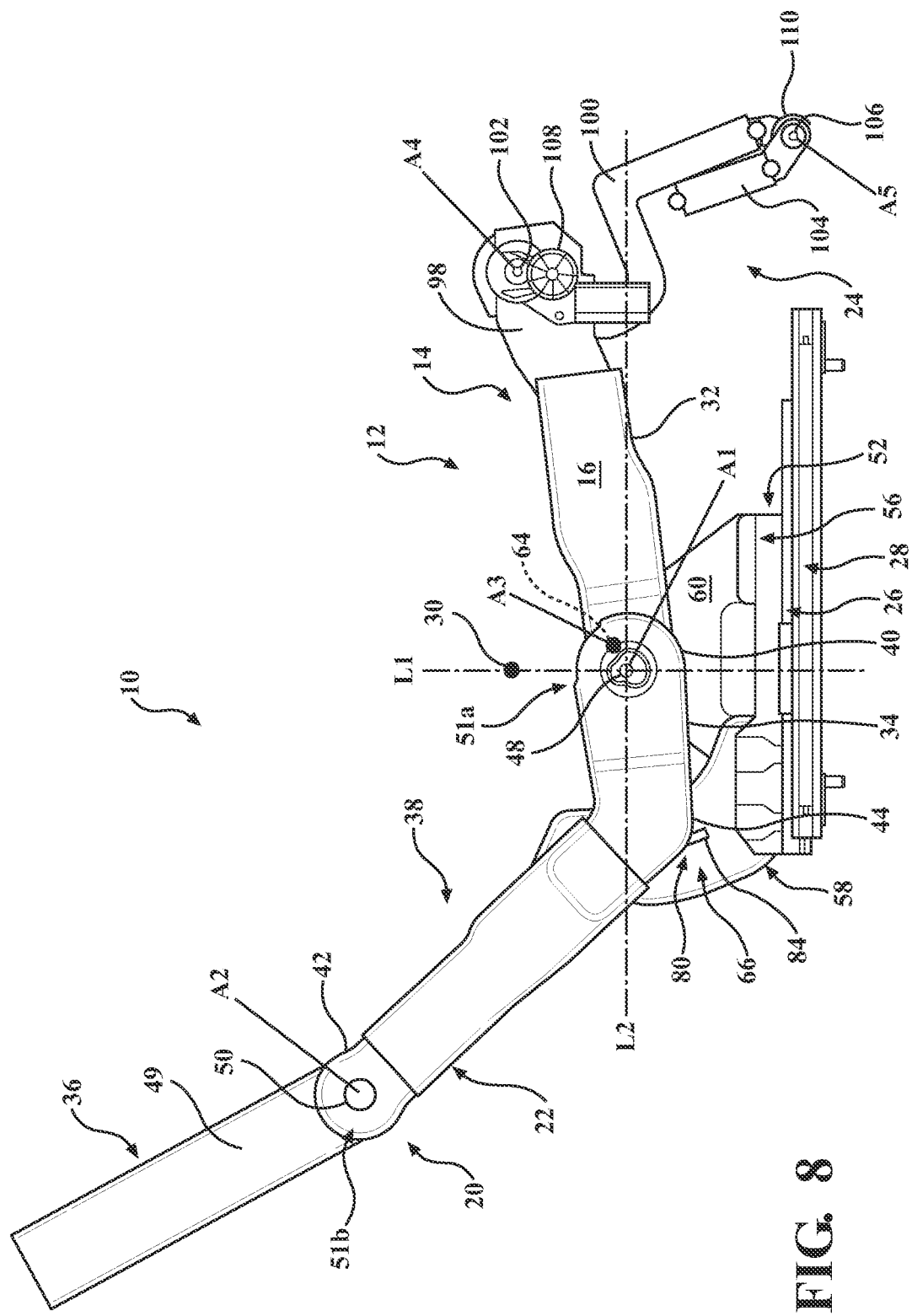
FIG. 8 is a side view of the seat assembly of FIG. 1 further showing the seat assembly in the second reclined position.

Referring to FIGS. 1, 7, and 8, the inner face 46 of each lower seat back portion 38 adjacent to the second end 42 thereof is pivotally coupled to an outer face 49 of the respective upper seat back portion 36 at an upper recline pivot 50 defining an upper recline pivot axis A2. The upper seat back portion 36 is pivotable at the upper recline pivot 50 about the upper recline pivot axis A2 for movement of the seat assembly 10 between the first reclined position, as shown in FIGS. 2B and 7, and the second reclined position, as shown in FIGS. 2C and 8, in which the upper seat back portion 36 tilts forwardly relative to the lower seat back portion 38 for increased support of the occupant's upper back and head. Although only the first and second reclined positions are shown in the Figures, it is to be appreciated that the seat assembly 10 is ultimately pivotable at the lower recline pivot 48 and the upper recline pivot 50 between any of a plurality of reclined positions, as is known in the art. Additionally, it is to be appreciated that the seat assembly 10 can alternatively omit the upper recline pivot 50 and the upper recline pivot axis A2 such that the upper seat back portion 36 and the lower seat back portion 38 are fixedly coupled instead of pivotally coupled at each lateral side 22 of the seat back 20 without varying the scope of the invention.

In the embodiment of the seat assembly 10 shown in the Figures, both the lower recline pivot 48 and the upper recline pivot 50 employ a power recliner mechanism, shown generally at 51a, 51b, for powered, electronically-controlled pivoting around the respective pivot axes A1, A2, as described in further detail below. One potential type of power recliner mechanism for use at the lower recline pivot 48 and/or the upper recline pivot 50 is a power recliner as described in U.S. Pat. No. 8,746,796, the disclosure of which is hereby incorporated by reference in its entirety. Alternatively, one or both of the lower recline pivot 48 and the upper recline pivot 50 can instead employ a manual recliner mechanism for pivoting around the respective pivot axes A1, A2. One potential type of manual recliner mechanism for use at the lower recline pivot 48 and/or the upper recline pivot 50 is a manual recliner as described in U.S. Pat. No. 7,766,428, the disclosure of which is also hereby incorporated by reference in its entirety.

Referring to FIGS. 1, 4, and 5, the seat base 26 includes a pair of substantially planar side walls 52 coupled together by a lateral support 54 extending therebetween, wherein each side wall 52 is positioned adjacent to the respective lateral side 14 of the seat cushion 12 for operative coupling therewith. Each side wall 52 of the seat base 26 includes an upwardly-extending front portion 56 and an upwardly-extending rear portion 58 with corresponding outer and inner faces 60, 62, and it is contemplated that the front and rear portions 56, 58 can be formed either as a single component or as separate components fixedly coupled together. Referring to FIGS. 5-7, the seat cushion 12 and seat base 26 are operatively coupled at a cushion pivot 64 defining a cushion pivot axis A3. Each outer face 60 of the seat base 26 at the front portion 56 thereof is pivotally coupled with the respective inner face 18 of the seat cushion 12 at the front portion 32 thereof such that the cushion pivot 64 is positioned forward (i.e., in the fore direction) of the first line L1. In the embodiment of the seat assembly 10 shown in the figures, the cushion pivot 64 is further positioned above the second line L2 when the seat assembly 10 is disposed in the design position. However, it is to be appreciated that the cushion pivot 64 can instead be positioned either on or below the second line L2 depending on the specific automotive vehicle in which the seat assembly 10 is implemented and the clearance needed under and around the seat cushion 12 when mounted to the floor of the automotive vehicle. It is also to be appreciated that the cushion pivot 64 can instead be positioned either on or rearward of the first line L1 depending on the specific automotive vehicle in which the seat assembly 10 is implemented and the clearance needed under and around the seat cushion 12 when mounted to the floor of the automotive vehicle. Referring to FIG. 3, the cushion pivot axis A3 extends substantially parallel to both the lower recline pivot axis A1 and the upper recline pivot axis A2.

Figure 9:
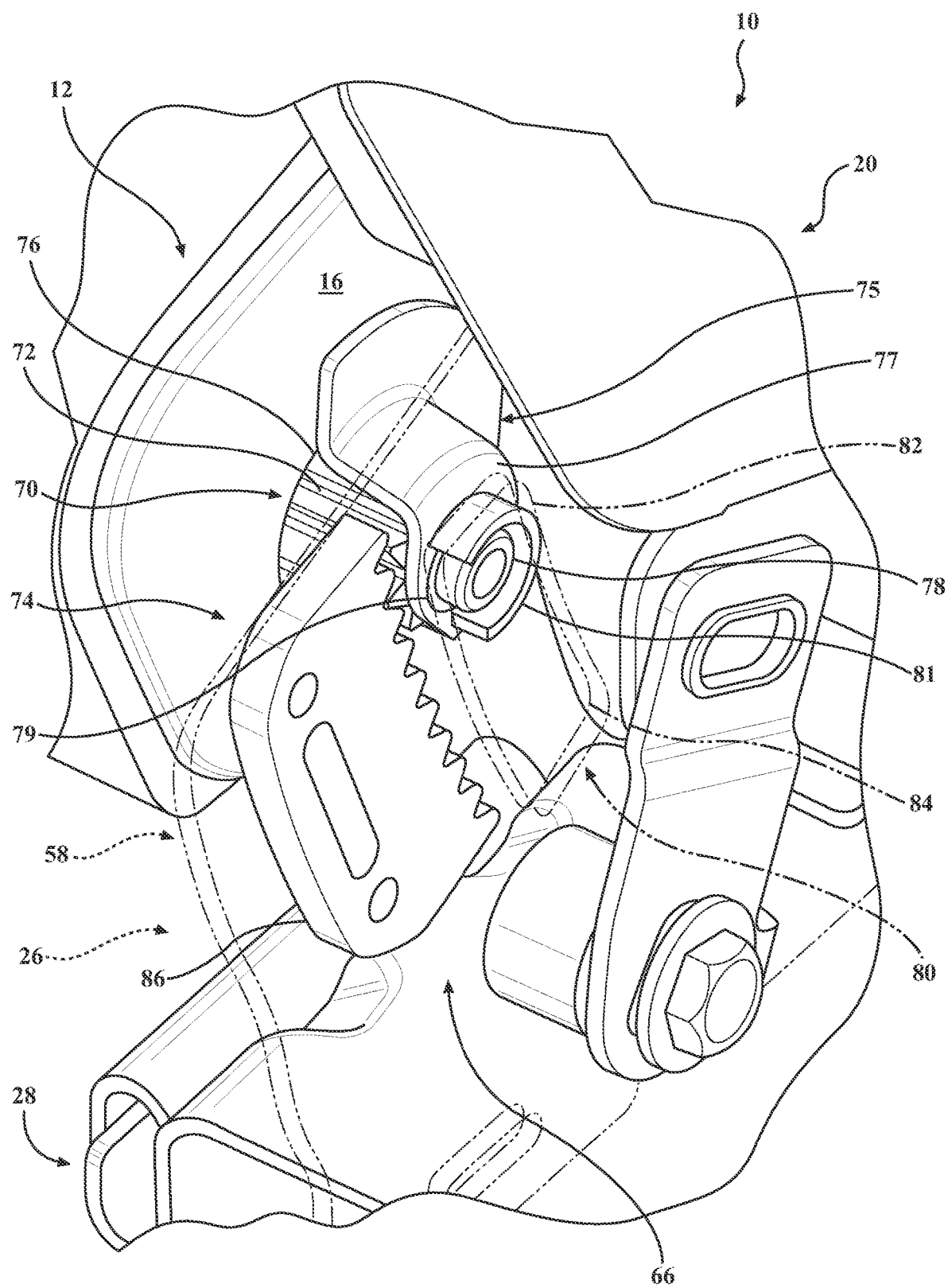
FIG. 9 is an enlarged fragmentary perspective view of the seat assembly of FIG. 1 further showing the tilt mechanism.

Referring to FIGS. 3-5, a tilt mechanism, shown generally at 66, is operatively coupled between the rear portion 34 of the seat cushion 12 and the seat base 26 for pivoting of the seat cushion 12 around the cushion pivot axis A3. The tilt mechanism 66 includes a motor assembly 68 mounted to the rear portion 34 of the seat cushion 12 at one of the inner faces 18 thereof for driving a pinion 70 integrated with the motor assembly 68, the pinion 70 including a plurality of teeth 72 extending radially outward therefrom, as shown in FIG. 9. The seat cushion 12 is coupled to the seat base 26 at the cushion pivot 64, thereby defining an interior space 74 between the inner face 62 of the seat base 26 and the outer face 16 of the seat cushion 12. The pinion 70 operatively extends from the motor assembly 68 and into the interior space 74 through a corresponding hole 76 in the lateral side 14 of the seat cushion 12, the pinion 70 terminating at a non-toothed distal portion 78. A bracket 75 is fixedly coupled to the outer face 16 of the seat cushion 12 and extends laterally within the interior space 74 to a terminal end 77 adjacent to the inner face 62 of the seat base 26. A hole 79 in the terminal end 77 of the bracket 75 rotatably receives the distal portion 78 of the pinion 70 for ensuring the pinion 70 remains properly positioned through the hole 76 of the seat cushion 12 while still allowing rotation relative thereto.

Figure 10B:
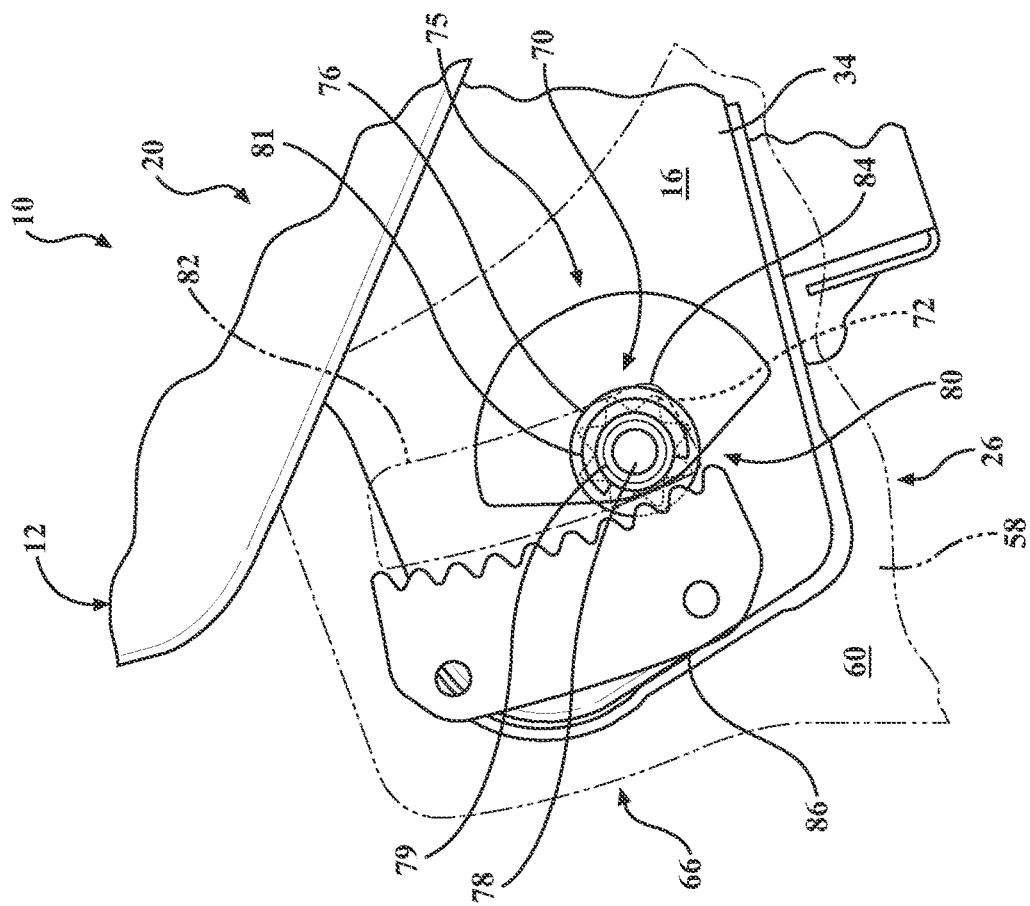
FIG. 10B is an enlarged fragmentary side view of the seat assembly of FIG. 1 showing the bracket and the pinion of the tilt mechanism disposed at a lower end of the elongated slot.
Figure 10A:
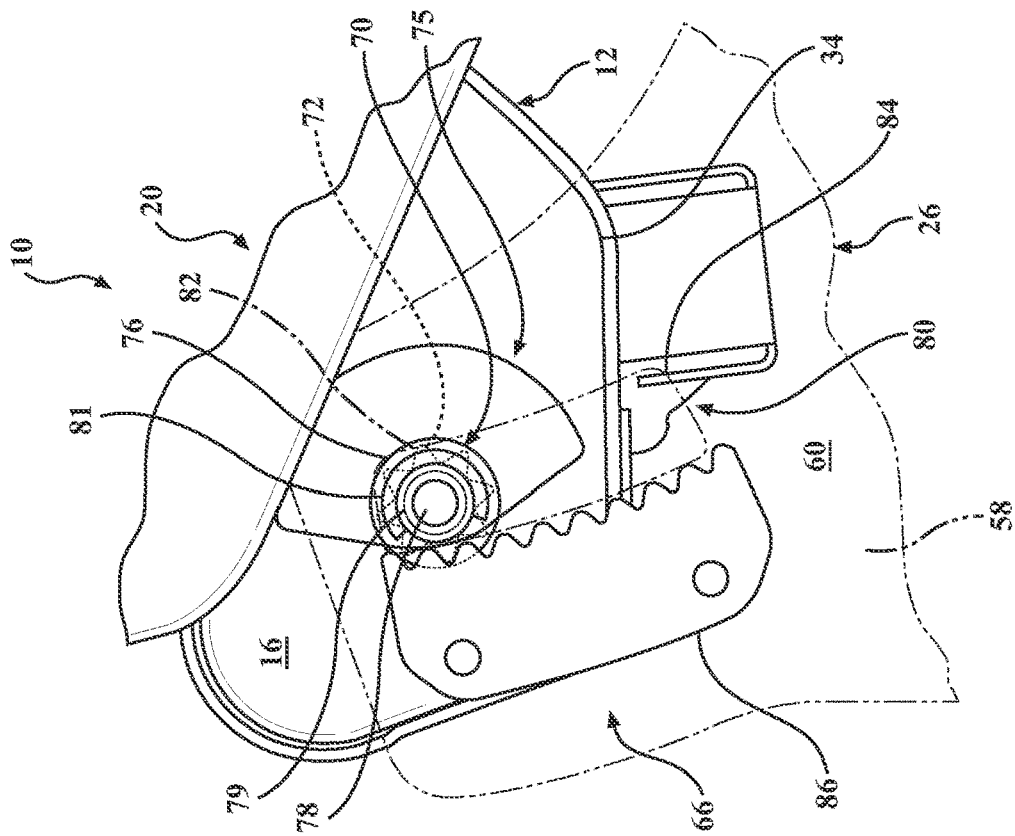
FIG. 10A is an enlarged fragmentary side view of the seat assembly of FIG. 1 showing a bracket and a pinion of the tilt mechanism disposed at an upper end of an elongated slot.
Figure 11:
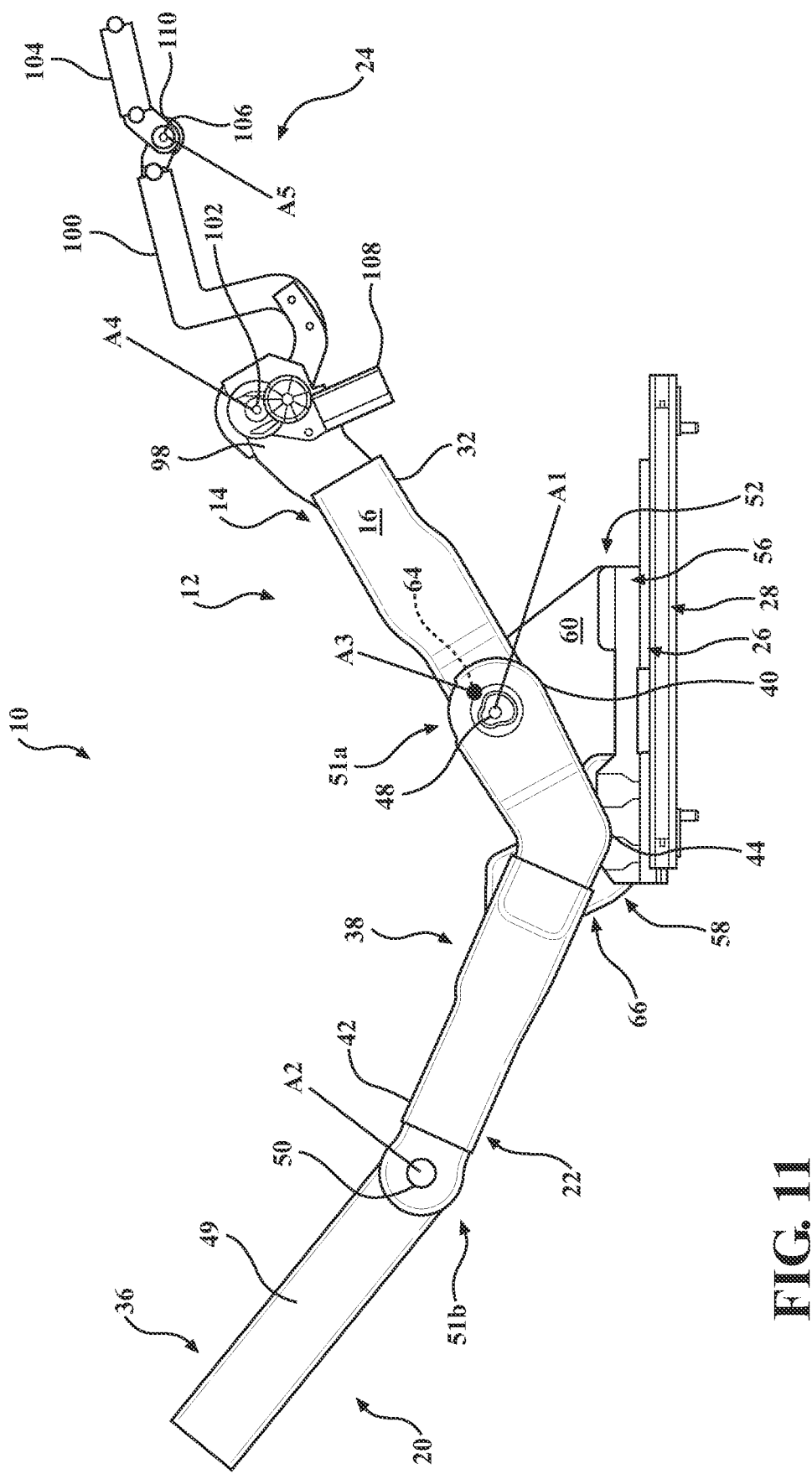
FIG. 11 is a side view of the seat assembly of FIG. 1 further showing the seat assembly in the zero-gravity position.

Referring to FIGS. 9, 10A, and 10B, the terminal end 77 of the bracket 75 includes an annular lip 81 extending substantially around the hole 79 therein. The distal portion 78 of the pinion 70 and an annular lip of the bracket 75 are received in an elongate slot 80 in the rear portion 58 of the seat base 26, wherein the elongate slot 80 extends upwardly and rearwardly on the rear portion 58 of the seat base 26 between an upper end 82 and an opposite lower end 84. The tilt mechanism 66 further includes a sector 86 fixedly coupled to the inner face 62 of the seat base 26 and positioned directly adjacent to the elongate slot 80 for meshing engagement with the teeth 72 extending from the pinion 70. Referring to FIGS. 10A and 10B, the motor assembly 68 is operable for selectively rotating the pinion 70, thereby causing the pinion 70 to travel along the sector 86 as a result of the meshing engagement therebetween and causing the annular lip 81 of the bracket 75 to correspondingly travel between the upper and lower ends 82, 84 of the elongate slot 80. As the pinion 70 travels along the sector 86 and the annular lip 81 travels between the upper and lower ends 82, 84 of the elongate slot 80, the seat cushion 12 correspondingly pivots around the cushion pivot axis A3, thereby tilting the seat cushion 12 relative to the seat base 26 for moving the seat assembly 10 between the first or second reclined position, as shown in FIGS. 7, 8, and 10A, and the zero-gravity position, as shown in FIGS. 10B and 11. Referring to FIG. 5, a tilt motor shaft 85 extends laterally from the tilt mechanism 66 toward the other of the side walls 52 of the seat base 26 for driving a substantially similar pinion along a substantially similar sector and slot configuration. However, as these components and their operation are substantially similar to the pinion 70, bracket 75, elongate slot 80, and sector 86 already described, they will not be discussed in further detail herein.

Referring to FIG. 1, the power recliner mechanism 51b at the upper recline pivot 50 includes a conventional motor assembly 87 for powered pivoting around the upper recline pivot axis A2. Similarly, the power recliner mechanism 51a at the lower recline pivot 48 includes a conventional motor assembly 89 for powered pivoting around the lower recline pivot axis A1, as shown in FIG. 6. The motor assembly 89 is fixedly coupled to one of the lateral sides 14 of the seat cushion 12 and positioned adjacent to the inner face 62 of the respective front portion 56 of the seat base 26. An arcuate slot 88 extending between a pair of opposite ends 90, 92 is arranged on each front portion 56 of the seat base 26, as shown in FIG. 5. The motor assembly 89 includes a motor shaft 94 with a pair of opposite ends 96 operatively extending through the respective arcuate slot 88 along the lower recline pivot axis A1 for rotation thereabout. Each of the opposite ends 96 of the motor shaft 94 are operatively coupled to the lower seat back portion 38 at the respective lateral side 22 thereof, as is known in the art, for powered pivoting of the seat back 20 relative to the seat cushion 12 around the lower recline pivot axis A1, as described above. Referring to FIG. 5, the motor shaft 94 is also able to travel within the arcuate slot 88 between the ends 90, 92 thereof, thereby allowing the motor shaft 94 to revolve around the cushion pivot axis A3 within the arcuate slot 88 as the seat cushion 12 pivots around the cushion pivot axis A3 for tilting of the seat cushion 12 relative to the seat base 26.

Referring to FIGS. 1 and 3, the leg support assembly 24 is operatively coupled to the seat cushion 12 at the front portion 32 thereof. The leg support assembly 24 includes a front bracket 98 fixedly coupled to the front portion 32 of the seat cushion 12 adjacent each lateral side 14 thereof, with each front bracket 98 extending generally forward therefrom. A first leg support element 100 is rotatably coupled between the front brackets 98 at a first leg support pivot 102 defining a first leg support pivot axis A4, and a second leg support element 104 is rotatably coupled to the first leg support element 100 at a second leg support pivot 106 defining a second leg support pivot axis A5. The first leg support element 100 and second leg support element 104 are rotatable around the respective leg support pivot axes A4, A5 for movement between a retracted condition, as shown in FIGS. 3, 7, and 8, and an extended condition, as shown in FIG. 11. In the retracted condition, the first and second leg support elements 100, 104 are generally disposed under the second line L2 for stowing of the leg support assembly 24 when not in use. In the extended condition, the first and second leg support elements 100, 104 rotate to extend outwardly relative to the seat cushion 12 for support of the occupant's lower legs. A conventional motor 108, 110 is operatively coupled to the leg support 24 assembly at each of the first leg support pivot 102 and the second leg support pivot 106 for powered rotation around the first and second leg support pivot axes A4, A5. Although one possible embodiment of the leg support assembly 24 is shown in the Figures and described herein, it is contemplated that the seat assembly 10 can include any alternative leg support assembly, or omit the leg support assembly entirely, without varying the scope of the invention.

The seat assembly 10 may further include a control unit operatively coupled to each of the various motors 68, 87, 89, 108, 110. As is known in the art, the control unit coordinates selective actuation of the motors 68, 87, 89, 108, 110 for sufficient rotation at the respective pivot axes (A3, A2, A1, A4, A5) to correctly position the seat assembly 10 in any of the previously-described, pre-determined seating positions. However, it is to be appreciated that any alternative means of selectively allowing rotation around the respective pivot axes A1-A5 for moving the seat assembly 10 to any of the previously-described, pre-determined seating positions can be utilized without varying the scope of the invention, including manual means known in the art, such as a cable-type actuation assembly.

In operation, the motor assembly 89 at the lower recline pivot 48 is actuated to move the seat assembly 10 from the design position, as shown in FIGS. 2A and 3, to the first reclined position, as shown in FIGS. 2B and 7. Actuation of the motor assembly 89 at the lower recline pivot 48 in a manner known in the art rotates the motor shaft 94 in a counterclockwise direction (when viewed from FIGS. 2A and 3) around the lower recline pivot axis A1. The seat back 20 pivots rearwardly relative to the seat cushion 12 such that each lower seat back portion 38 from the first end 40 to the angled portion 44 thereof is substantially flush with the respective lateral side 14 of the seat cushion 12, as shown in FIG. 7. Similarly, the seat assembly 10 can be moved to and from the second reclined position, as shown in FIGS. 2C and 8, by actuating the motor assembly 87 at the upper recline pivot 50. Actuation of the motor assembly 87 at the upper recline pivot 50 in a manner known in the art rotates the upper recline pivot 50 in a clockwise direction (when viewed from FIGS. 2C and 8) around the upper recline pivot axis A2. The upper seat back portion 36 then pivots forwardly relative to the lower seat back portion 38 to move the seat assembly 10 to the second reclined position for increased support of the occupant's upper back and head.

Referring to FIGS. 8-11, the motor assembly 68 of the tilt mechanism 66 and the motors 108, 110 at the first and second leg support pivots 102, 106 are actuated to move the seat assembly 10 from either the first reclined position or the second reclined position to the zero-gravity position. Actuation of the motor assembly 68 rotates the pinion 70 relative to the hole 76 of the seat cushion 12, causing the pinion 70 to travel along the sector 86 and causing the annular lip 81 of the bracket 75 to correspondingly travel from the upper end 82 of the elongate slot, as shown in FIG. 10A, to the lower end 84 of the elongate slot 80, as shown in FIG. 10B. As the pinion 70 travels along the sector 86 and the annular lip 81 travels from the upper end 82 to the lower end 84 of the elongate slot 80, the seat cushion 12 correspondingly pivots around the cushion pivot axis A3 in the counterclockwise direction (when viewed from FIGS. 8 and 10), thereby tilting the seat cushion 12 rearwardly relative to the seat base 26. The seat back 20, already in a reclined position as described above, remains in the reclined position and does not rotate further at the lower recline pivot 48 about the lower recline pivot axis A1. As the pinion 70 travels along the sector 86, the motor shaft 94 travels within the arcuate slot 88 in the seat base 26 between the ends 90, 92 thereof, as shown in FIG. 5, thereby allowing the seat back 20 to correspondingly tilt rearwardly relative to the seat base 26 with the seat cushion 12. Additionally, actuation of the motors 108, 110 at the first and second leg support pivots 102, 106 in a manner known in the art rotates the first and second leg support pivots 102, 106 in a counterclockwise direction (when viewed from FIGS. 8 and 11) around the first and second leg support pivot axes A4, A5. The first leg support element 100 and second leg support element 104 each extend outwardly relative to the seat cushion 12 for moving the leg support assembly 24 from the retracted condition to the extended condition to support the occupant's lower legs, as shown in FIG. 11, thereby completing movement of the seat assembly 10 to the zero-gravity position.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A seat assembly for use by an occupant in an automotive vehicle, the seat assembly comprising:
    a seat base adapted for mounting the seat assembly within the automotive vehicle, the seat base extending between a front portion and an opposite rear portion;
    a seat cushion for supporting the occupant in the automotive vehicle, the seat cushion pivotally coupled to the seat base at a cushion pivot defining a cushion pivot axis;
    a seat back pivotally coupled to the seat cushion at a lower recline pivot defining a lower recline pivot axis,
    wherein the seat assembly is pivotable at the cushion pivot and the lower recline pivot for moving the seat assembly between a design position for upright seating of the occupant within the automotive vehicle and a zero-gravity position in which the seat back pivots rearwardly relative to the seat cushion and the seat cushion pivots rearwardly relative to the seat base for reclined lounging of the occupant within the automotive vehicle; and
    an H-point of the occupant spaced generally above the seat cushion, wherein a first line (L1) extends vertically through the H-point when the seat assembly is disposed in the design position, the first line defining a front portion and an opposite rear portion of the seat cushion, and
    wherein the lower recline pivot is positioned under the H-point approximately on the first line (L1) and the cushion pivot is positioned forward of the first line (L1) between the front portion of the seat cushion and the seat base to facilitate optimal comfort for the occupant when the seat assembly is disposed in the zero-gravity position.

2. The seat assembly of claim 1 further comprising a tilt mechanism operatively coupled between the rear portion of the seat base and the rear portion of the seat cushion for pivoting the seat cushion around the cushion pivot axis.

3. The seat assembly of claim 2 further comprising a leg support assembly operatively coupled to the seat cushion, the leg support assembly operable between a retracted condition and an extended condition for additional support of the occupant in the automotive vehicle.

4. The seat assembly of claim 3 wherein the seat assembly is pivotable at the lower recline pivot for movement of the seat assembly between the design position and a first reclined position in which the seat back tilts rearwardly relative to the seat cushion.

5. The seat assembly of claim 4 wherein the seat back is divided into an upper seat back portion and a lower seat back portion, the lower seat back portion coupled to the seat base at the lower recline pivot, and the upper seat back portion pivotally coupled to the lower seat back portion at an upper recline pivot defining an upper recline pivot axis.

6. The seat assembly of claim 5 wherein the seat assembly is pivotable at the upper recline pivot for movement of the seat assembly between the first reclined position and a second reclined position in which the upper seat back portion tilts forwardly relative to the lower seat back portion for additional support of the occupant in the automotive vehicle.

7. The seat assembly of claim 6 wherein the lower seat back portion extends between a first end and an opposite second end with an intermediate angled portion spaced therebetween, and wherein the first end is pivotally coupled with the seat cushion at the lower recline pivot and the second end is pivotally coupled with the upper seat back portion at the upper recline pivot.

8. The seat assembly of claim 7 wherein a second line (L2) extends horizontally through the lower recline pivot when the seat assembly is disposed in the design position, and wherein the cushion pivot is further positioned above the second line (L2) between the front portion of the seat cushion and the seat base.

9. The seat assembly of claim 8 wherein the leg support assembly is disposed in the retracted condition when the seat assembly is disposed in each of the design position, the first reclined position, and the second reclined position, and wherein the leg support assembly is disposed in the extended condition when the seat assembly is disposed in the zero-gravity position.

10. The seat assembly of claim 9 wherein the rear portion of the seat base includes an elongate slot extending upwardly and rearwardly therethrough, and wherein and the rear portion of the seat cushion includes a hole extending therethrough, the hole positioned adjacent to the elongate slot.

11. The seat assembly of claim 10 wherein the tilt mechanism includes a motor assembly mounted to the seat cushion and adapted for driving a pinion operatively integrated therewith, the pinion terminating at a distal portion.

12. The seat assembly of claim 11 wherein the tilt mechanism further includes a bracket fixedly coupled to the rear portion of the seat cushion adjacent to the hole therein and extending to a terminal end received by the elongate slot in the rear portion of the seat base, and wherein the bracket further includes a hole through the terminal end thereof.

13. The seat assembly of claim 12 wherein the tilt mechanism further includes a sector fixedly coupled to the rear portion of the seat base adjacent to the elongate slot.

14. The seat assembly of claim 13 wherein the pinion extends through the hole in the seat cushion for meshing engagement with the sector, the pinion adapted to travel along the sector to pivot the seat cushion around the cushion pivot axis.

15. The seat assembly of claim 14 wherein the distal portion of the pinion is rotatably received by the hole in the bracket for ensuring the pinion remains properly positioned through the hole in the seat cushion while still allowing rotation relative thereto.

16. The seat assembly of claim 15 wherein the seat assembly further includes a seat track assembly operatively coupled to the seat base for selective movement of the seat assembly in a fore direction and an opposite aft direction within the automotive vehicle.

17. The seat assembly of claim 16 wherein the H-point of the occupant is defined as a location on the seat assembly of a hip joint of a 50th percentile male occupant.

18. The seat assembly of claim 17 further comprising a motor operatively coupled to each of the upper recline pivot and the lower recline pivot for powered rotation around the upper recline pivot axis and the lower recline pivot axis.

19. The seat assembly of claim 18 wherein the lower seat back portion from the first end to the angled portion thereof is substantially flush with the seat cushion when the seat assembly is disposed in each of the first reclined position, the second reclined position, and the zero gravity position.

* * * * *